US011429171B1

(12) United States Patent
Cook et al.

(10) Patent No.: US 11,429,171 B1
(45) Date of Patent: Aug. 30, 2022

(54) SYSTEM AND METHOD FOR POWER SUPPLY CONTROLS FOR SELECTION OF VOLTAGE OPERATION

(71) Applicant: Dell Products L.P., Round Rock, TX (US)

(72) Inventors: Wayne Kenneth Cook, Round Rock, TX (US); Wei-Jun Feng, Braintree, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/443,896

(22) Filed: Jul. 28, 2021

(51) Int. Cl.
*G06F 1/26* (2006.01)
*G06F 1/28* (2006.01)
*G06F 1/30* (2006.01)

(52) U.S. Cl.
CPC .............. *G06F 1/28* (2013.01); *G06F 1/263* (2013.01); *G06F 1/305* (2013.01)

(58) Field of Classification Search
CPC ............ G06F 1/263; G06F 1/28; G06F 1/305
See application file for complete search history.

(56) References Cited

U.S. PATENT DOCUMENTS

2017/0214402 A1\* 7/2017 Englekirk ................. H03F 3/45
2019/0094936 A1\* 3/2019 Cook ....................... G06F 1/266

\* cited by examiner

*Primary Examiner* — Mark A Connolly
(74) *Attorney, Agent, or Firm* — Baker Botts, L.L.P.

(57) ABSTRACT

A system for controlling voltage operation of a power supply unit (PSU) for an information handling system. If the PSU is established as a High-Line power supply and is a dual wattage unit, Low-Line capabilities are disabled and the PSU turns off if power drops below a High-Line minimum voltage. If the PSU is established as a Low-Line PSU or is not dual wattage unit, the PSU is maintained in a current operational state and is either reset or turned off before making changes.

18 Claims, 3 Drawing Sheets

| XXH | LINE_STATUS | | | |
|---|---|---|---|---|
| BIT | NAME | VALUE | DESCRIPTION | NOTE |
| 7 | CHANGE_LINE_STATUS | 1 | PSU IS ABLE TO UPDATE LINE_STATUS | READ/WRITE |
| | | 0 | LINE_STATUS HAS BEEN UPDATED | |
| 6 | HIGH-LINE OPERATION | 1 | SET HIGH LINE OPERATION ONLY | READ/WRITE |
| | | 0 | RESET HIGH LINE OPERATION ONLY | |
| 5:4 | RESERVED | 0000 | RESERVED | |
| 3:0 | LINE_STATUS | 0000 | LOW LINE, 50 HZ AC DETECTED | |
| | | 0001 | NO POWER INPUT FOR WIDE RANGE PSU | IDENTIFIES UNPOWERED UNIT AS WIDE RANGE TYPE |
| | | 0010 | HIGH LINE DETECTED | |
| | | 0011 | NO POWER INPUT FOR TELECOM DC PSU | IDENTIFIES UNPOWERED UNIT AS TELECOM DC TYPE |
| | | 0100 | LOW LINE 60 HZ AC DETECTED | |
| | | 0101 | NO POWER INPUT FOR EXTENDED WIDE RANGE AC | IDENTIFIES POWER INPUT AS EXTENDED WIDE RANGE AC |
| | | 0110 | HIGH LINE 60 HZ AC DETECTED | |

FIG. 3

SYSTEM AND METHOD FOR POWER SUPPLY CONTROLS FOR SELECTION OF VOLTAGE OPERATION

BACKGROUND

Field of the Disclosure

This disclosure relates generally to information handling systems and, more particularly, to methods for supplying power to information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments disclosed herein may be generally directed to information handling systems and systems and methods for controlling power supply units (PSUs) for selection of voltage operation.

Embodiments disclosed herein may be directed to systems and methods by which a wide range power supply units (PSUs) can be limited to operate only at a high line condition.

BRIEF DESCRIPTION OF THE DRAWINGS

For a more complete understanding of the invention and its features and advantages, reference is now made to the following description, taken in conjunction with the accompanying drawings, in which:

FIG. 3 depicts a portion of a data structure comprising settings for a PSU.

DESCRIPTION OF PARTICULAR EMBODIMENT(S)

Figure 1:
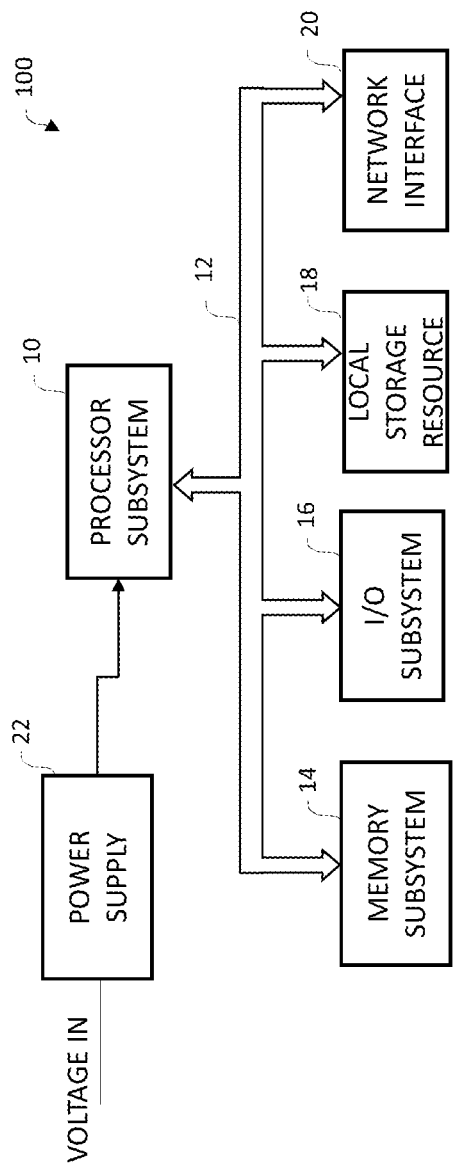
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, PSU "22" refers to an instance of a power supply unit, which may be referred to collectively as PSUs "22" and any one of which may be referred to generically as PSU "22."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Figure 2:
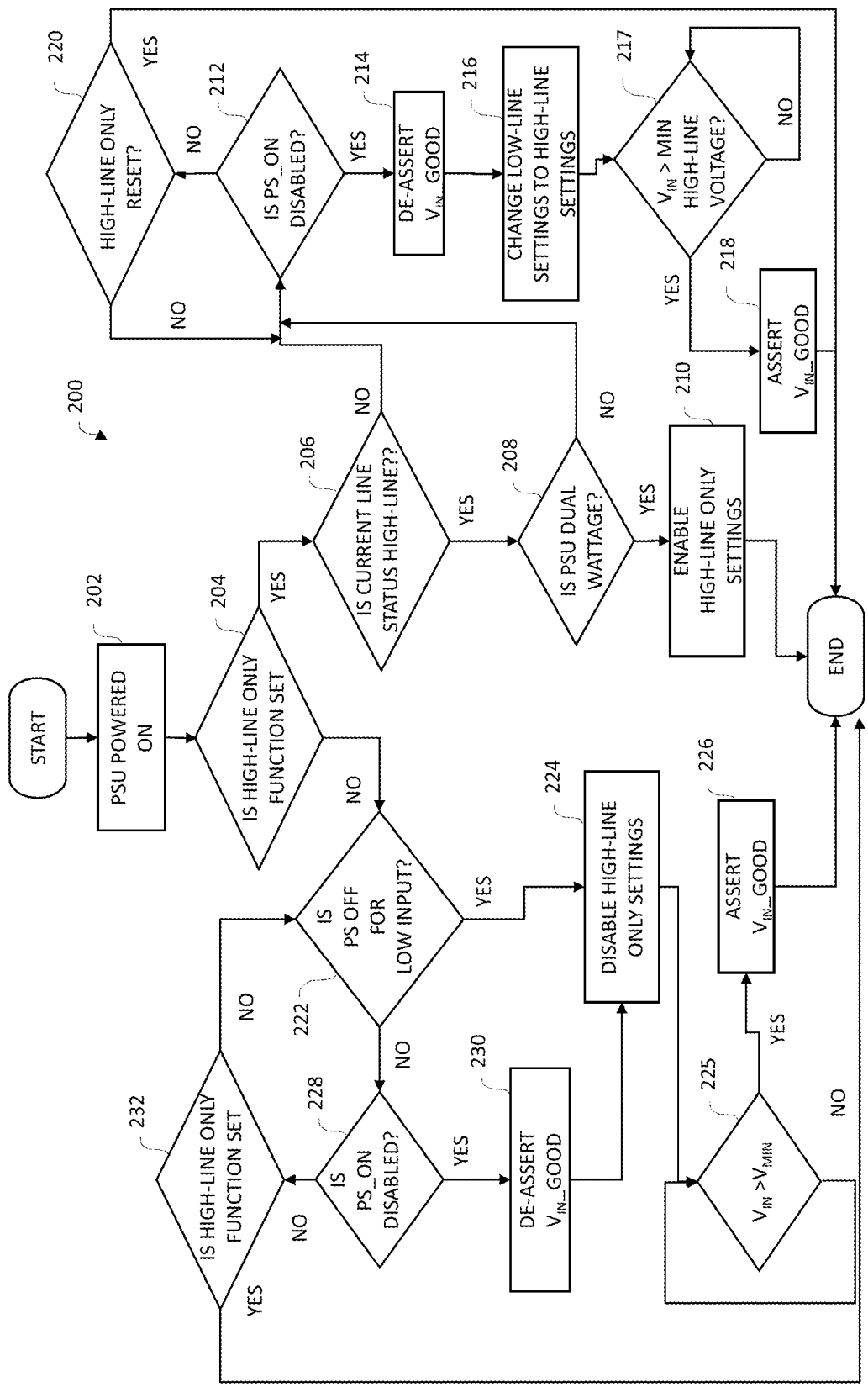
FIG. 2 is flow diagram depicting a method for configuring a power supply unit for operation using only high-line settings.

Particular embodiments are best understood by reference to FIGS. 1-3, wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 10, which may comprise one or more processors, and a system bus 12 that communicatively couples various system components to processor subsystem 10 including, for example, a memory subsystem 14, an I/O subsystem 16, local storage resource 18, and network interface 20. Information handling system 100 further comprises power supply unit (PSU) 22.

Processor subsystem 10 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 10 may interpret and execute program instructions and process data stored locally (e.g., in memory subsystem 14). In the same or alternative embodiments, processor subsystem 10 may interpret and execute program instructions and process data stored remotely (e.g., in a network storage resource).

System bus 12 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 14 may comprise a system, device, or apparatus operable to retain and retrieve program instructions and data for a period of time (e.g., computer-readable media). Memory subsystem 14 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system 100, is powered down.

In information handling system 100, I/O subsystem 16 may comprise a system, device, or apparatus generally operable to receive and transmit data to or from or within information handling system 100. I/O subsystem 16 may represent, for example, a variety of communication interfaces, graphics interfaces, video interfaces, user input interfaces, and peripheral interfaces. In various embodiments, I/O subsystem 16 may be used to support various peripheral devices, such as a touch panel, a display adapter, a keyboard, a touch pad, or a camera, among other examples. In some implementations, I/O subsystem 16 may support so-called 'plug and play' connectivity to external devices, in which the external devices may be added or removed while information handling system 100 is operating.

Local storage resource 18 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 20 may be a suitable system, apparatus, or device operable to serve as an interface between information handling system 100 and a network (not shown). Network interface 20 may enable information handling system 100 to communicate over a network using a suitable transmission protocol or standard. In some embodiments, network interface 20 may be communicatively coupled via a network to a network storage resource (not shown). A network coupled to network interface 20 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 20 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 20 or various components associated therewith may be implemented using hardware, software, or any combination thereof.

Power supply unit (PSU) 22 supplies electric power to information handling system 100. Some power supply units 22 can operate over a wide voltage range, for example: 90-264 Vac. Some PSUs 22 are dual wattage units that can operate at a Low-Line voltage or a High-Line voltage. For example, a Low-Line voltage may be between 90-135 Vac and a High-Line voltage may be between 180-265 Vac, for example. An input voltage ($V_{IN}$) frequency may be between 45-65 Hz. PSU 22 is configured such that an input voltage less than a minimum input voltage does not damage PSU 22. For example, if information handling system 100 is operating at a High-Line voltage and the input voltage drops below a High-Line minimum voltage, PSU 22 may switch operation to Low-Line voltage.

In some information handling systems 100, a typical maximum power available is approximately 1200 W at 100 Vac and 2400 W at 200 Vac. An 1100 W PSU 22 has roughly a maximum input current consumption of 12 A while operating at 100 Vac, but only consumes about 6 A while operating at 200 Vac. Therefore, when an information handling system 100 is operating at a high line voltage, almost twice as many PSUs 22 can operate on a given 15 A branch. PSU efficiency and internal loads (e.g., a microcontroller unit (MCU) or a fan) may reduce the maximum power available to information handling system 100.

Power Delivery Limitations

Due to the power delivery infrastructure limitations of systems of information handling systems 100, either at the rack level or the data center level, there is a need to control the amount of current that is being consumed by multiple information handling systems 100 so as not to overload the power network. For example, a 15 A branch power distribution is typically limited to 12 A at nominal voltages by product safety agencies. These limitations can be observed at the branch power distribution and data center transformers levels.

Data centers typically design their power infrastructures for High-Line voltage operation. However, in the event of a voltage brownout, multiple information handling systems 100 may switch to Low-Line voltage operation (as described above), causing an increase in current draw. The increase in current draw can overload the power grid, resulting in breakers being tripped. Tripping breakers at a data center can be a major inconvenience to the end user.

Embodiments disclosed herein include a control system and method for controlling PSUs to operate only at a High Line voltage. Setting or resetting the PSU 22 to operate in High-Line Only may be performed at any time. However, switching operation to High-Line Only operation may be performed when the switch will have the least impact on operation by the information handling system 100.

FIG. 2 depicts a flow diagram 200 of a method for controlling voltage operation at a PSU 22. In general, controlling PSU 22 to operate in High-Line Only mode may be accomplished by setting or clearing a bit of the Line Status Register (discussed in greater detail below).

The method may begin at step 202 when an input voltage ($V_{IN}$) is supplied to PSU 22.

At step 204, upon the application of an input voltage to PSU, a micro controller unit (MCU) in PSU 22 determines if a High-Line Only bit is set. The High-Line Only bit may be stored in non-volatile memory. A vendor may have disabled a High-Line Only bit to disable High-Line Only operation. In some embodiments, bit 6 of a Line Status Register (e.g., D8) is checked before the assertion of $V_{IN\_GOOD}$.

Information Handling System is Set for High-Line Only Operation

If the MCU determines a High-Line Only bit is set, then at step 206, the MCU determines if the current line status is High-Line, indicating PSU 22 is set to supply power at a High-Line voltage level.

If the MCU determines that the current line status is set to High-Line, the MCU determines at step 208 if PSU 22 is a dual wattage PSU.

Dual Wattage PSU

If the MCU determines that PSU 22 is a dual wattage PSU, then at step 210, MCU enables High-Line Only settings and the method ends. Thus, if the PSU is a dual wattage PSU and is currently operating as a high line power supply, the High-Line Only operation can be locked in with no system disruptions since PSU 22 is already operating as a High-Line power supply.

Current Line Status is not High Line or PSU is not Dual Wattage

If the MCU determines that the High-Line Only bit is set to operate information handling system 100 in High-Line operation but the current line status is not High-Line mode or PSU 22 is not a dual wattage PSU, the system will need to switch when PS_ON is disabled. At step 212, the MCU determines if PS_ON is disabled. PS_ON is a signal communicated to PSU 22 to power up, wherein when PS_ON is disabled, PSU 22 does not power up.

Switch can Occur Once PS_ON is Disabled

Once the MCU determines that PS_ON is disabled, then the MCU may determine it is safe to switch PSU 22 to High-Line Only operation. At step 214, $V_{IN}$_GOOD is de-asserted unless it was previously de-asserted and, at step 216, Low-Line voltage settings are changed to High-Line Only settings. At step 217, Once all the settings have been changed and the MCU determines the input voltage ($V_{IN}$) meets the minimum High-Line voltage requirements, $V_{IN}$_GOOD is asserted at step 218 and the process ends. If $V_{IN}$ doesn't meet the minimum High-Line voltage requirements the MCU will remain in a wait state until the minimum High-Line voltage requirements are met. Thus, steps 204, 206, 212, 214, 216, 217 and 218 may be performed when the High-Line Only bit is set but the current line status is not High-Line and PS_ON is disabled to prevent PSU 22 from powering up and damaging information handling system 100.

High-Line Only Settings May be Reset

If the MCU determines that PS_ON is enabled, then at step 220, the MCU determines if High-Line Only settings indicate voltage operation of PSU have been reset. In some embodiments, the MCU determines, from a Line Status Register that a bit (e.g., bit 6) is set to "0", indicating that the High-Line Only settings are targeted for reset.

If the MCU determines that the High-Line Only settings are targeted to be reset, the process ends. The next time information handling system 100 powers up, PSU 22 may determine the High-Line Only bit is reset and provide High-Line power to information handling system 100.

If the MCU determines at step 220 that the High-Line Only settings have not been reset, PSU 22 continues operating in its current operational state until PS_ON is disabled or the High-Line Only operation has been reset. MCU may continue to monitor settings to determine when PS_ON is disabled or High-Line Only settings are reset.

High-Line Only Bit is not Set

Information handling system 100 may be operating in a low voltage mode (Low-Line). Referring to step 204, if the MCU determines a High-Line Only bit is not set, then at step 222, the MCU determines if the PSU 22 is off due to low input voltage.

PSU is Off Due to Low Input Voltage

If the MCU determines that PSU 22 is off due to low input voltage, then at step 224, the MCU may disable High-Line Only settings. At step 225, once all the settings have been changed and the MCU determines the input voltage ($V_{IN}$) meets the minimum requirements, $V_{IN}$_GOOD is asserted at step 226 and the process ends. If $V_{IN}$ doesn't meet the minimum input voltage requirements the MCU will remain in a wait state until the minimum input voltage requirements are met.

PSU is not Off

If the MCU determines that PSU 22 is not off due to low input voltage, then at step 228, the MCU determines if PS_ON is disabled.

If the MCU determines that PS_ON is disabled, then at step 230, the MCU de-asserts $V_{IN}$_GOOD, disables High-Line Only settings at step 224. At step 225, once all the settings have been changed and the MCU determines the input voltage ($V_{IN}$) meets the minimum requirements, $V_{IN}$_GOOD is asserted at step 226 and the process ends. If $V_{IN}$ doesn't meet the minimum input voltage requirements the MCU will remain in a wait state until the minimum input voltage requirements are met.

If the MCU determines that PS_ON is enabled, then at step 232, the MCU determines if the High-Line Only bit is set.

If the MCU determines that the High-Line Only bit is set, the process ends.

If the MCU determines that the High-Line Only bit is not set, the MCU may continue monitoring PSU 22 until PSU 22 turns off due to low input voltage or the High-Line Only bit is set.

In some embodiments, PSU 22 may be a dual wattage unit, wherein the control system may determine whether to enable PSU 22 for High-Line Only operation or to mismatch it based upon other operational units.

In some embodiments, PSU 22 may be a single rated unit over the application of a wide range of input voltages, wherein the voltage control system may enable PSU 22 to operate unless the unit has a different wattage rating than other operational PSUs in the system.

A wide range PSU 22 will draw roughly two times the input current when operation at low line (120 Vac) verses an equivalent unit operating at high line (240 Vac).

If the rated wattage of multiple PSUs 22 is considered as a system, regardless of whether its input voltage is a high line or a low line voltage, the system will allow the PSUs 22 to be enabled.

Through the use a new Intelligent Power Module Management (IPMM) command the system can program a power supply to only operate as a high line power supply.

FIG. 3 depicts a portion of a data structure containing information that may be found in a Line Status register. As depicted in FIG. 3, settings 302 corresponding to bits may contain information about the status of PSU 22.

Setting 302-1 corresponding to bit 7 contains Change_Line_Status information, wherein a value of 1 indicates PSU 22 is able to update Line_Status and a value of 0 indicates Line_Status has been updated.

Setting 302-2 corresponding to bit 6 contains High-Line Operation information, wherein a value of 1 indicates PSU 22 is set for High-Line Only operation and a value of 0 indicates PSU 22 is reset for High-Line Only operation.

Setting 302-3 corresponding to bits 3:0 contains Line_Status information, wherein each value may contain information regarding if a voltage is detected, a voltage level (Low-Line or High-Line), a frequency, and the type of PSU.

Although it is desirable to set a PSU as a high line PSU prior to enabling PS_ON, the power supply can be programmed at any time. However, to prevent damage to PSU 22 or information handling system 100 controlling voltage operation should conform to certain requirements.

For example, if the PSU 22 has a single wattage rating (E.G. 800 W) and the control system sets the High-Line Only bit for High-Line Only operation, the switch to High-Line Only operation will not take effect until PS_ON is disabled. This allows for PSU 22 to lock in only High-Line Only features such as input voltage turn-on and turn-off voltages, brown-out voltage settings and input over-current settings.

Embodiments may utilize $V_{IN}$_GOOD as a trigger mechanism for the control system to monitor. Once the control system disables PS_ON, an MCU in PSU 22 will drop (de-assert) $V_{IN}$_GOOD settings, make the necessary changes, and reassert $V_{IN}$_GOOD settings to notify the control system that changes to the High-Line Only settings have been incorporated.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for controlling voltage operation of a power supply unit (PSU) in an information handling system, the method comprising:
   determining if a High-Line Only bit is set, wherein:
   if the High-Line Only bit is set, determining if a current line status is High-Line;
      if the current line status is High-Line, determining if the PSU is a dual wattage unit;
         if the PSU is a dual wattage unit, enabling High-Line Only voltage settings;
         if the PSU is not a dual wattage unit, determining if a PS_ON setting is disabled;
            if the PS_ON is enabled, de-asserting a $V_{IN}$_GOOD setting, changing a set of Low-Line settings to a set of High-Line Only settings and asserting the $V_{IN}$_GOOD setting;
            if the PS_ON setting is disabled, determining if the High-Line Only bit is reset;
   if the High-Line Only bit is not set, determining if the PSU is off due to low input voltage;
      if the PSU is off due to low input voltage, disabling High-Line Only settings and asserting the $V_{IN}$_GOOD setting;
      if the PSU is not due to low input voltage, determining if the PS_ON is disabled; and
         if the PS_ON is disabled, de-asserting the $V_{IN}$_GOOD setting, disabling High-Line Only settings and asserting the $V_{IN}$_GOOD setting.

2. The method of claim 1, further comprising determining the input voltage is greater than a minimum input voltage level before asserting the $V_{IN}$_GOOD setting.

3. The method of claim 1, further comprising storing the High-Line Only bit in non-volatile memory.

4. The method of claim 1, further comprising maintaining the PSU in a Low Line mode until the PS_ON setting is disabled.

5. The method of claim 1, further comprising:
   determining that the PSU is a dual wattage unit; and
   determining to enable the PSU for High-Line Only operation based upon other operational PSUs in the system.

6. The method of claim 1, wherein the High-Line Only settings include input voltage turn-on and turn-off voltages, brown-out voltage settings and input over-current settings.

7. A system for controlling voltage operations in a Power Supply Unit (PSU), the system comprising:
   a memory medium storing a set of voltage operation settings; and
   a microcontroller unit (MCU) in the PSU, the MCU configured to:
      determine if a High-Line Only bit is set in the memory medium, wherein:
      if the High-Line Only bit is set, determine if a current line status is High-Line;
         if the current line status is High-Line, determine if the PSU is a dual wattage unit;
            if the PSU is a dual wattage unit, enable High-Line Only voltage settings;
            if the PSU is not a dual wattage unit, determine if a PS_ON setting is disabled;
               if the PS_ON setting is enabled, de-assert a $V_{IN}$_GOOD setting, change a set of Low-Line settings to a set of High-Line Only settings and assert the $V_{IN}$_GOOD setting;
               if the PS_ON setting is disabled, determine if the High-Line Only bit is reset; and
      if the High-Line Only bit is not set, determine if the PSU is off due to low input voltage;
         if the PSU is off due to low input voltage, disable High-Line Only settings and assert the $V_{IN}$_GOOD setting;
         if the PSU is not due to low input voltage, determine if the PS_ON is disabled;
            if the PS_ON is disabled, de-assert the $V_{IN}$_GOOD setting, disable High-Line Only settings and assert the $V_{IN}$_GOOD setting.

8. The system of claim 7, wherein the MCU is further configured to determine the input voltage is greater than a minimum input voltage level before asserting the $V_{IN}$_GOOD setting.

9. The system of claim 7, wherein the MCU is further configured to store the High-Line Only bit in non-volatile memory.

10. The system of claim 7, wherein the MCU is further configured to maintain the PSU in a Low Line mode until the PS_ON setting is disabled.

11. The system of claim 7, wherein the MCU is further configured to:
    determine that the PSU is a dual wattage unit; and
    determine to enable the PSU for High-Line Only operation based upon other operational PSUs in the system.

12. The system of claim 7, wherein the High-Line Only settings include input voltage turn-on and turn-off voltages, brown-out voltage settings and input over-current settings.

13. An information handling system, comprising:
    a processor subsystem;
    a memory subsystem storing information; and
    a power supply unit (PSU) for providing power at a voltage to the information handling system, the PSU comprising:

a memory medium storing a set of voltage operation settings; and a microcontroller unit (MCU) in the PSU, the MCU configured to:
  determine if a High-Line Only bit is set in the memory medium, wherein:
    if the High-Line Only bit is set, determine if a current line status is High-Line;
      if the current line status is High-Line, determine if the PSU is a dual wattage unit;
      if the PSU is a dual wattage unit, enable High-Line Only voltage settings;
      if the PSU is not a dual wattage unit, determine if a PS_ON setting is disabled;
      if the PS_ON setting is enabled, de-assert a $V_{IN\_}GOOD$ setting, change a set of Low-Line settings to a set of High-Line Only settings and assert the $V_{IN\_}GOOD$ setting;
      if the PS_ON setting is disabled, determine if the High-Line Only bit is reset; and
    if the High-Line Only bit is not set, determine if the PSU is off due to low input voltage;
      if the PSU is off due to low input voltage, disable High-Line Only settings and assert the $V_{IN\_}GOOD$ setting;
      if the PSU is not due to low input voltage, determine if the PS_ON is disabled; and
      if the PS_ON is disabled, de-assert the $V_{IN\_}GOOD$ setting, disable High-Line Only settings and assert the $V_{IN\_}GOOD$ setting.

14. The information handling system of claim 13, wherein the MCU is further configured to determine the input voltage is greater than a minimum input voltage level before asserting the $V_{IN}\_GOOD$ setting.

15. The information handling system of claim 13, wherein the MCU is further configured to store the High-Line Only bit in non-volatile memory.

16. The information handling system of claim 13, wherein the MCU is further configured to maintain the PSU in a Low Line mode until the PS_ON setting is disabled.

17. The information handling system of claim 13, wherein the MCU is further configured to:
  determine that the PSU is a dual wattage unit; and
  determine to enable the PSU for High-Line Only operation based upon other operational PSUs in the system.

18. The information handling system of claim 13, wherein the High-Line Only settings include input voltage turn-on and turn-off voltages, brown-out voltage settings and input over-current settings.

* * * * *